(12) United States Patent
Hasegawa et al.

(10) Patent No.: US 10,382,694 B2
(45) Date of Patent: Aug. 13, 2019

(54) IMAGE SIGNAL PROCESSING APPARATUS AND IMAGE SIGNAL PROCESSING PROGRAM PRODUCT

(71) Applicant: DENSO CORPORATION, Kariya, Aichi-pref. (JP)

(72) Inventors: Takaomi Hasegawa, Kariya (JP); Takashi Hashizume, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 72 days.

(21) Appl. No.: 15/501,211

(22) PCT Filed: Jul. 24, 2015

(86) PCT No.: PCT/JP2015/003714
§ 371 (c)(1),
(2) Date: Feb. 2, 2017

(87) PCT Pub. No.: WO2016/021135
PCT Pub. Date: Feb. 11, 2016

(65) Prior Publication Data
US 2018/0091740 A1 Mar. 29, 2018

(30) Foreign Application Priority Data
Aug. 5, 2014 (JP) .................. 2014-159449

(51) Int. Cl.
*H04N 5/232* (2006.01)
*B60R 1/00* (2006.01)
(Continued)

(52) U.S. Cl.
CPC .......... *H04N 5/23293* (2013.01); *B60R 1/00* (2013.01); *G09G 5/00* (2013.01); *G09G 5/02* (2013.01);
(Continued)

(58) Field of Classification Search
None
See application file for complete search history.

(56) References Cited

U.S. PATENT DOCUMENTS 9,387,813 B1 *  7/2016  Moeller .................. B60R 11/04
2004/0143380 A1 *  7/2004  Stam ...................... B60Q 1/085
                                                                          701/36
(Continued)

FOREIGN PATENT DOCUMENTS

JP     2009175904 A     8/2009
JP     2009284023 A    12/2009
(Continued)

OTHER PUBLICATIONS

U.S. Appl. No. 15/501,220, filed Feb. 2, 2017, Hasegawa et al.

*Primary Examiner* — Chikaodili E Anyikire
(74) *Attorney, Agent, or Firm* — Harness, Dickey & Pierce, P.L.C.

(57) ABSTRACT

An image signal processing apparatus includes a first control unit, a second control unit starting activation when the first control unit completes activation and shifting from off-state to normal operating state, and a decoding unit. The second control unit processes an image included in a received image signal, and outputs an image signal including a processed image. The second control unit outputs, after starting the activation, a synchronization signal to the decoding unit even before completion of activation. The second control unit outputs, after the completion of activation, image signal including the processed image in conformity to the synchronization signal. Before the image signal including the processed image is transmitted from the second control unit, the decoding unit outputs the image signal transmitted from an image capturing unit bypassing the second control unit to the
(Continued)

display unit in conformity to the synchronization signal outputted from the second control unit.

6 Claims, 5 Drawing Sheets

(51) Int. Cl.
*G09G 5/00* (2006.01)
*H04N 7/18* (2006.01)
*H04N 19/136* (2014.01)
*G09G 5/02* (2006.01)
*G09G 5/12* (2006.01)
*G09G 5/14* (2006.01)

(52) U.S. Cl.
CPC .............. *G09G 5/12* (2013.01); *G09G 5/14* (2013.01); *H04N 5/232* (2013.01); *H04N 5/23222* (2013.01); *H04N 5/23241* (2013.01); *H04N 7/18* (2013.01); *H04N 7/183* (2013.01); *H04N 19/136* (2014.11); *B60R 2300/30* (2013.01); *G09G 2340/10* (2013.01); *G09G 2340/12* (2013.01); *G09G 2340/125* (2013.01); *G09G 2340/14* (2013.01); *G09G 2370/12* (2013.01); *G09G 2380/10* (2013.01)

(56) References Cited

U.S. PATENT DOCUMENTS

| | | | |
|---|---|---|---|
| 2004/0230358 A1* | 11/2004 | Stam | B60Q 1/1423 701/49 |
| 2016/0011576 A1* | 1/2016 | Takeda | B62D 15/029 700/20 |
| 2017/0098304 A1* | 4/2017 | Blais-Morin | H04N 5/23229 |

FOREIGN PATENT DOCUMENTS

| JP | 2014197370 A | 10/2014 |
|---|---|---|
| WO | WO-2016021133 A1 | 2/2016 |

* cited by examiner

IMAGE SIGNAL PROCESSING APPARATUS AND IMAGE SIGNAL PROCESSING PROGRAM PRODUCT

CROSS REFERENCE TO RELATED APPLICATIONS

This application is a U.S. National Phase Application under 35 U.S.C. 371 of International Application No. PCT/JP2015/003714 filed on Jul. 24, 2015 and published in Japanese as WO 2016/021135 A1 on Feb. 11, 2016. This application is based on and claims the benefit of priority from Japanese Patent Application No. 2014-159449 filed on Aug. 5, 2014. The entire disclosures of all of the above applications are incorporated herein by reference.

TECHNICAL FIELD

The present disclosure relates to an image signal processing apparatus and an image signal processing program product each of which performs an image processing to an image included in an image signal outputted from an image capturing unit and displays a processed image on a display unit.

BACKGROUND ART

Up to now, a vehicle image signal processing apparatus that displays a vehicle surrounding image, which is acquired by an imaging device, on a display device is provided. In this case, when an image signal including, for example, a video indicating rear side of a vehicle which is a blind spot of a driver is input from the imaging device, the input image signal is decoded. The video included in the decoded image signal is processed, and the video that has been processed (processed video) is displayed on the display device. In the video processing, guide lines (for example, vehicle width extension lines, etc.), button keys, and so on are drawn for on-screen display in order to display the on-screen drawn video. In recent years, a first control unit and a second control unit are provided for the purpose of dispersing a processing load. In this configuration, when an accessory (ACC) power supply is switched from off to on, the first control unit starts activation firstly, and the second control unit starts activation after the first control unit completes the activation.

In a configuration where the first control unit and the second control unit are provided and the image processing is performed by the second control unit, the processed image cannot be displayed immediately after the accessory power supply is switched from off to on. Regarding this matter, Patent Literature 1 discloses a configuration in which when the accessory power supply is switched from off to on, unprocessed image (raw image) is displayed until the second control unit completes the activation, and the second control unit controls the processed image (image that has been processed) to be displayed after the second control unit completes the activation.

In the configuration of Patent Literature 1, after the second control unit completes the activation, the image signal output to the display device is switched from the image signal including the raw image to the image signal including the processed image, and the image display is switched from the raw image to the processed image. However, the above configuration suffers from such a problem that a black screen is unavoidably displayed when switching of the image signal, which is to be output to the display device, takes place. In other words, when switching the image display from the raw image to the processed image, the black screen is displayed on the display device.

PRIOR ART LITERATURE

Patent Literature

[Patent Literature 1] JP 2009-284023 A

SUMMARY OF INVENTION

The present disclosure has been made in view of the above difficulties, and it is an object of the present disclosure to provide an image signal processing apparatus and an image signal processing program product each of which is capable of avoiding the display of a black screen when an image display switches from a display of unprocessed image to a display of processed image.

According to a first aspect of the present disclosure, an image signal processing apparatus includes an image signal processing apparatus includes a first control unit starting an activation in response to an activation request, a second control unit starting an activation when the first control unit completes the activation and shifting from an off-state to a normal operating state after the activation is completed, and a decoding unit starting an activation when the first control unit completes the activation and shifting from an off-state to a normal operating state after the activation is completed. The second control unit processes, in the normal operating state, an image included in an image signal in response to a reception of the image signal from an image capturing unit, and outputs an image signal including a processed image. The decoding unit receives, in the normal operating state, the image signal including an unprocessed image and transmitted from the image capturing unit bypassing the second control unit and the image signal including the processed image and transmitted from the image capturing unit through the second control unit, outputs one of the image signals that are received to a display unit, and controls the display unit to display one of the unprocessed image or the processed image.

When the second control unit starts the activation, the second control unit outputs a synchronization signal to the decoding unit even before completing of the activation. When the second control unit completes the activation, the second control unit outputs the image signal including the processed image in conformity to the synchronization signal. During a period before the decoding unit receives the image signal including the processed image from the second control unit, the decoding unit outputs, to the display unit, the image signal transmitted from the image capturing unit bypassing the second control unit in conformity to the synchronization signal outputted from the second control unit.

In the decoding unit, when the second control unit completes the activation, the image signal to be output to the display unit is switched from the image signal including the raw video to the image signal including the processed video. In this situation, the decoding unit receives the synchronization signal even before the second control unit completes the activation (prior to the completion of activation), and outputs the image signal, which is received from the image capturing unit and transmitted bypassing the second control unit, in conformity to the synchronization signal. The decoding unit has no need to switch the synchronization signal when switching the image signal to be output to the display device. Thus, the decoding unit can switch the display of the video seamlessly while keeping a synchronized state (without loss of synchronization). With the above configuration, the decoding unit has no need to switch the synchronization signal when switching the image signal to be output to the display unit, and can switch the display of the video seamlessly while keeping a synchronized state (without loss of synchronization). Hence, the display of the black screen can be avoided when switching the image display.

According to a second aspect of the present disclosure, an image signal processing program product stored in a computer-readable non-transitory tangible storage medium, comprising instructions to be executed by a computer included in an image signal processing apparatus according to the first aspect. The instructions comprising, after starting the activation, controlling the second control unit to output a synchronization signal to the decoding unit even before the second control unit completes the activation, controlling the second control unit to determine whether the second control unit has completed the activation, and controlling the second control unit to output the image signal including the processed image in conformity to the synchronization signal when determining that the second control unit has completed the activation.

According to the above program product, the display of the black screen can be avoided when switching the image display from the unprocessed image to the processed image.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
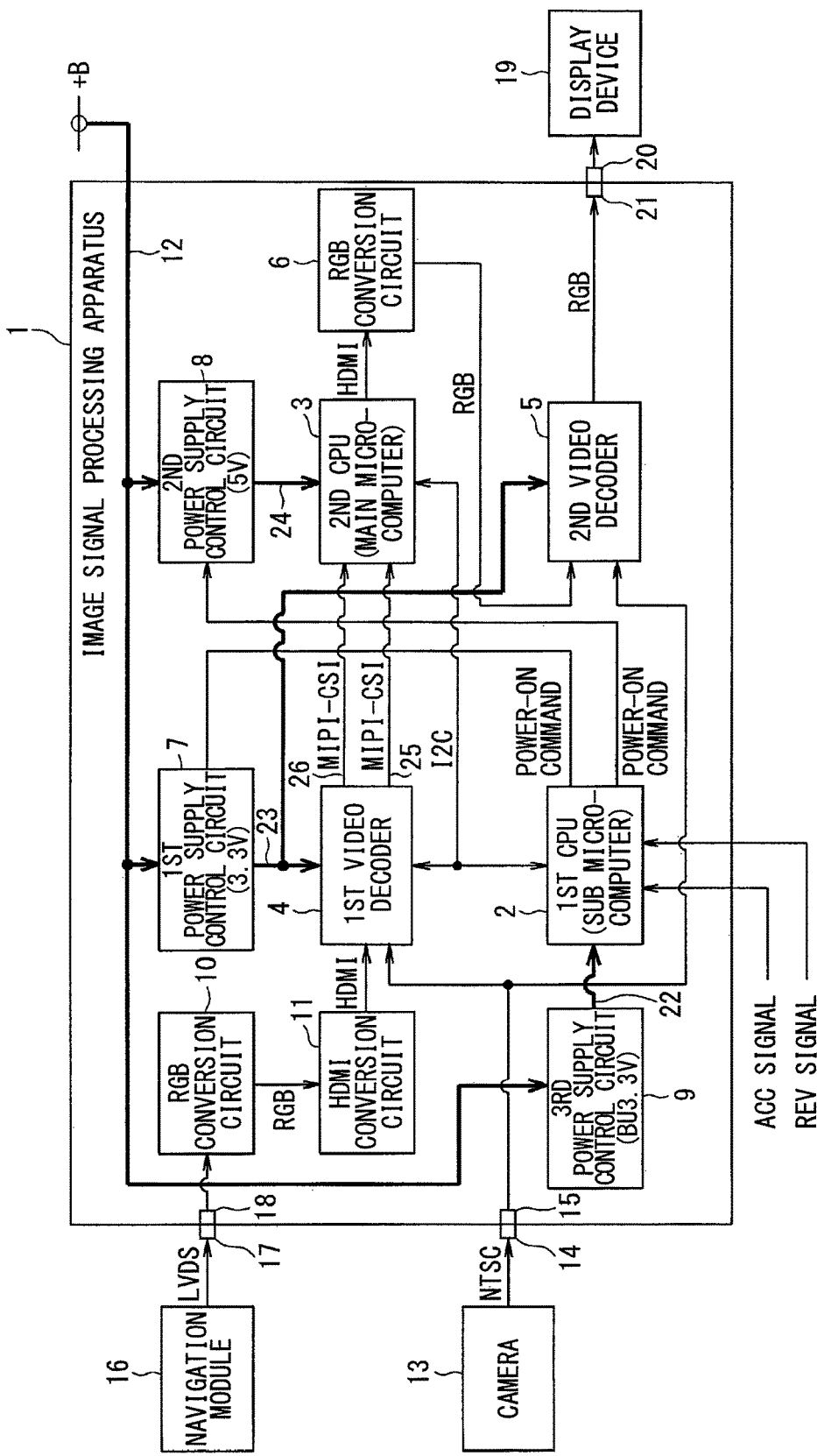
FIG. 1 is a functional block diagram illustrating an embodiment of the present disclosure.

Hereinafter, a vehicle image signal processing apparatus mountable to a vehicle according to an embodiment of the present disclosure will be described with reference to the drawings. An image signal processing apparatus 1 includes a first CPU (central processing unit) 2 (corresponding to a first control unit), a second CPU 3 (corresponding to a second control unit), a first video decoder 4, a second video decoder 5 (corresponding to a decoding unit), an RGB conversion circuit 6, a first power supply control circuit 7, a second power supply control circuit 8, a third power supply control circuit 9, an RGB conversion circuit 10, and an HDMI (registered trademark) (High-Definition Multimedia Interface) conversion circuit 11. The image signal processing apparatus 1 supplies a power, which is supplied from a vehicle battery, to the first power supply control circuit 7, the second power supply control circuit 8, and the third power supply control circuit 9 through a power line 12, and ensures an operating power of the overall device.

The first CPU 2 has specialized characteristics for data processing of a vehicle system to realize a vehicle control, and the second CPU 3 has specialized characteristics for the data processing of an information system such as image data or music data. Data of the information system to be processed by the second CPU 3 is relatively large in data capacity as compared with data of a vehicle system to be processed by the first CPU 2. For that reason, an OS (operating system) and a control program loaded by the second CPU 3 when the second CPU 3 starts activation as will be described later are relatively large in the data capacity as compared with an OS and a control program loaded by the first CPU 2 when the first CPU 2 starts activation.

The image signal processing apparatus 1 can receive an NTSC (national television system committee) signal (image signal) from a camera 13 by connecting a connector 14 of the camera 13 (corresponding to an image capturing unit) with a connector 15 of the image signal processing apparatus 1. The connector 14 of the camera 13 is connected with the camera 13 via a cable. The camera 13 is, for example, a rear camera that is attached to a rear side of the vehicle, captures rear side images of the vehicle, and outputs the NTSC signal including the acquired video to the image signal processing apparatus 1 (first video decoder 4 and second video decoder 5). The rear side of the vehicle is a blind spot to the driver.

In addition, the image signal processing apparatus 1 can receive an LVDS (low voltage differential signaling) signal (image signal) from a navigation module 16 by connecting a connector 17 of the navigation module 16 with a connector 18 of the image signal processing apparatus 1. The connector 17 of the navigation module 16 is connected with the navigation module via a cable. The navigation module 16 generates various screens related to a navigation such as a menu screen, a screen for setting a destination, a screen for route guidance, or a screen for an enlarged view of an intersection, and outputs the LVDS signal including videos of the generated various screens to the image signal processing apparatus 1 (RGB conversion circuit 10). Upon receiving the LVDS signal from the navigation module 16, the RGB conversion circuit 10 converts the received LVDS signal into an RGB signal, and outputs the converted data to the HDMI conversion circuit 11. Upon receiving the RGB signal from the RGB conversion circuit 10, the HDMI conversion circuit 11 converts the received RGB signal into an HDMI signal and outputs the converted data to the first video decoder 4.

In addition, the image signal processing apparatus 1 can output the RGB signal (image signal) to a display device 19 (corresponding to a display unit) by connecting a connector 20 of the display device 19 with a connector 21 of the image signal processing apparatus 1. The connector 20 of the display device 19 is connected with the display device 19 via a cable. The display device 19 is provided by, for example, a liquid crystal display disposed in a vehicle interior and having a predetermined number of pixels (the number of pixels). Upon receiving the RGB signal from the image signal processing apparatus 1, the display device 19 processes the received RGB signal and displays (draws) a video.

The third power supply control circuit 9 generates a backup operating power having a preset operating voltage (3.3 Volts) from the power supplied from the vehicle battery through a power line 12, and supplies the generated operating power to the first CPU 2 through a power line 22.

The first CPU 2 functions as a sub microcomputer in the image signal processing apparatus 1, and the second CPU 2 functions as a main microcomputer in the image signal processing apparatus 1. The first CPU 2 monitors, in a low power consumption operating state, switching of an ACC signal indicative of an on/off state of an accessory (ACC) power supply from OFF to ON. Upon receiving the ACC signal and detecting the switching of the ACC signal from OFF to ON, the first CPU 2 detects the switching (turning on of the accessory power supply by the driver) of the accessory power from OFF to ON. By detecting the switching of the accessory power supply from OFF to ON, the first CPU 2 detects a generation of a request for activating the subject vehicle.

Upon detecting the switching of the accessory power supply from OFF to ON, the first CPU 2 starts a startup process (starts the activation). The first CPU 2 starts a pre-defined activating procedure (loading of an OS and a control program, etc.). When the activating procedure has been normally completed, the first CPU 2 completes the startup process (completes the activation), and shifts from the low power consumption operating state to a normal operating state. Upon shifting to the normal operating state, the first CPU 2 outputs a power-on command to the first power supply control circuit 7, and outputs the power-on command to the second power supply control circuit 8. In this case, the first CPU 2 is designed so as to output the power-on command within, for example, 200 msec after starting the activation.

Figure 2:
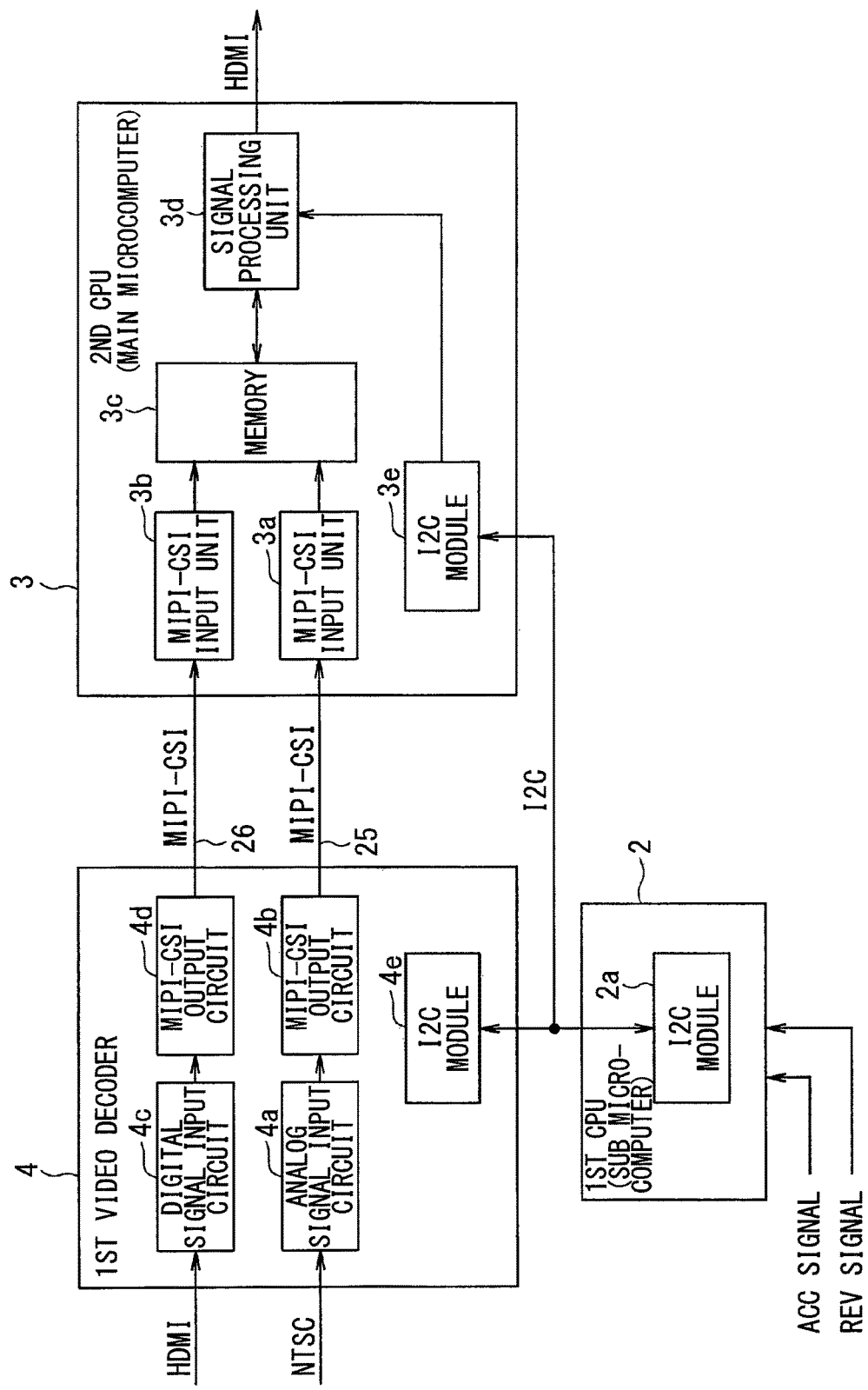
FIG. 2 is a functional block diagram illustrating a configuration of a first CPU, a second CPU, and a first video decoder.

In addition, the first CPU 2 monitors, in the normal operating state, the switching of a reverse (REV) signal indicating whether a shift lever is at a reverse position from OFF to ON. Upon receiving the REV signal and detecting the switching of the REV signal from OFF to ON, the first CPU 2 detects the shift of the shift lever to the reverse position (operation of shifting the shift lever to the reverse position by the driver). In addition, as illustrated in FIG. 2, the first CPU 2 includes an I2C (Inter-Integrated Circuit) module 2a. The first CPU 2 performs a data communication with the second CPU 3 or the first video decoder 4 by controlling the I2C module 2a to perform a data communication control.

The first power supply control circuit 7 generates an operating power having a preset operating voltage (3.3 Volts) from a power supplied from the vehicle battery through the power line 12. Upon receiving the power-on command from the first CPU 2, the first power supply control circuit 7 generates the operating power and supplies the generated operating power to the first video decoder 4 and the second video decoder 5 through a power line 23.

The second power supply control circuit 8 can generate an operating power having a preset operating voltage (5 Volts) from the power supplied from the vehicle battery through the power line 12. Upon receiving the power-on command from the first CPU 2, the second power supply control circuit 8 generates the operating power and supplies the generated operating power to the second CPU 3 through a power line 24.

Upon receiving the operating power from the first power supply control circuit 7 through the power line 23, the first video decoder 4 shifts from the off-state to the normal operating state. In the normal operating state, upon receiving the NTSC signal from the camera 13, the first video decoder 4 decodes the received NTSC signal and outputs the decoded NTSC signal to the second CPU 3. In addition, in the normal operating state, upon receiving the HDMI signal from the HDMI conversion circuit 11, the first video decoder 4 processes the received HDMI signal and outputs the decoded HDMI signal to the second CPU 3.

More specifically, as illustrated in FIG. 2, the first video decoder 4 includes an analog signal input circuit 4a, an MIPI (Mobile Industry Processor Interface)-CSI (Camera Serial Interface) output circuit 4b, a digital signal input circuit 4c, an MIPI-CSI output circuit 4d, and an I2C module 4e.

Upon receiving the NTSC signal from the camera 13, the analog signal input circuit 4a outputs the received NTSC signal to the MIPI-CSI output circuit 4b.

Upon receiving the NTSC signal from the analog signal input circuit 4a, the MIPI-CSI output circuit 4b converts the received NTSC signal into a signal of an MIPI-CSI data format and outputs the converted data to the second CPU 3 through a first transmission path 25.

Upon receiving the HDMI signal from the HDMI conversion circuit 11, the digital signal input circuit 4c outputs the received HDMI signal to the MIPI-CSI output circuit 4d.

Upon receiving the HDMI signal from the digital signal input circuit 4c, the MIPI-CSI output circuit 4d converts the received HDMI signal into a signal of the MIPI-CSI data format, and outputs the converted data to the second CPU 3 through a second transmission path 26. In other words, the first video decoder 4 includes a route for decoding the received NTSC signal received from the camera 13 to output the decoded NTSC signal and a route for decoding the HDMI signal received from the HDMI conversion circuit 11 to output the decoded HDMI signal, and the two routes are independent from one another. In addition, the first video decoder 4 performs a data communication with the first CPU 2 and the second CPU 3 by controlling the I2C module 4e to perform the data communication control.

Upon receiving the operating power from the second power supply control circuit 8 through the power line 24, the second CPU 3 starts the startup process (starts the activation). Upon starting the activation, the second CPU 3 generates and outputs a synchronization signal (clock signal having a predetermined frequency), and starts the pre-defined activating procedure (loading the OS and the control program, etc.). Upon normal completion of the activating procedure, the second CPU 3 completes the startup process (completes the activation), and shifts from the off-state to the normal operating state. In this case, the second CPU 3 is designed so as to output the synchronization signal within, for example, 1.3 msec after starting the activation. In the normal operating state, upon receiving the signal of the MIPI-CSI data format from the first video decoder 4, the second CPU 3 processes the image included in the received signal and outputs the HDMI signal including the processed image to the RGB conversion circuit 6.

More specifically, as illustrated in FIG. 2, the second CPU 3 includes MIPI-CSI input units 3a, 3b, a memory 3c, a signal processing unit 3d, and an I2C module 3e. Upon receiving a signal of the MIPI-CSI data format from the first video decoder 4 through the first transmission path 25, the MIPI-CSI input unit 3a outputs image data included in the received signal to a first storage area of the memory 3c and stores (writes) the output image data in the first storage area. The first storage area is a circular reference type storage area. Upon receiving the signal of the MIPI-CSI data format from the first video decoder 4 through the second transmission path 26, the MIPI-CSI input unit 3b outputs the image data included in the received signal to a second storage area of the memory 3c, and stores (writes) the output image data in the second storage area. The second storage area is also a circular reference type storage area. In other words, the second CPU 3 includes a route for receiving a signal obtained by decoding the NTSC signal from the camera 13 and a route for receiving a signal obtained by decoding the LVDS signal from the navigation module 16, and the two routes are independent from one another.

During a period where a condition for outputting the image of the camera 13 is satisfied, the signal processing unit 3*d* reads out the image data stored in the first storage area of the memory 3*c*, and draws, for on-screen display, guide lines (for example, vehicle width extension lines, etc.), button keys, and the like on the image of the readout image data. The signal processing unit 3*d* outputs the HDMI signal including the on-screen drawn image to the RGB conversion circuit 6. In this situation, the second CPU 3 outputs the HDMI signal to the RGB conversion circuit 6 in conformity to the synchronization signal. On the other hand, during a period where a condition for outputting the image of the navigation module 16 is satisfied, the signal processing unit 3*d* reads out the image data stored in the second storage area of the memory 3*c*, and outputs the HDMI signal including the image of the read image data to the RGB conversion circuit 6. In this situation, the second CPU 3 also outputs the HDMI signal to the RGB conversion circuit 6 in conformity to the synchronization signal. The second CPU 3 performs a data communication with the first CPU 2 or the first video decoder 4 by controlling the I2C module 3*e* to perform a data communication control.

Upon receiving the HDHI signal from the second CPU 3, the RGB conversion circuit 6 converts the received HDMI signal into the RGB signal and outputs the converted data to the second video decoder 5.

Figure 3:
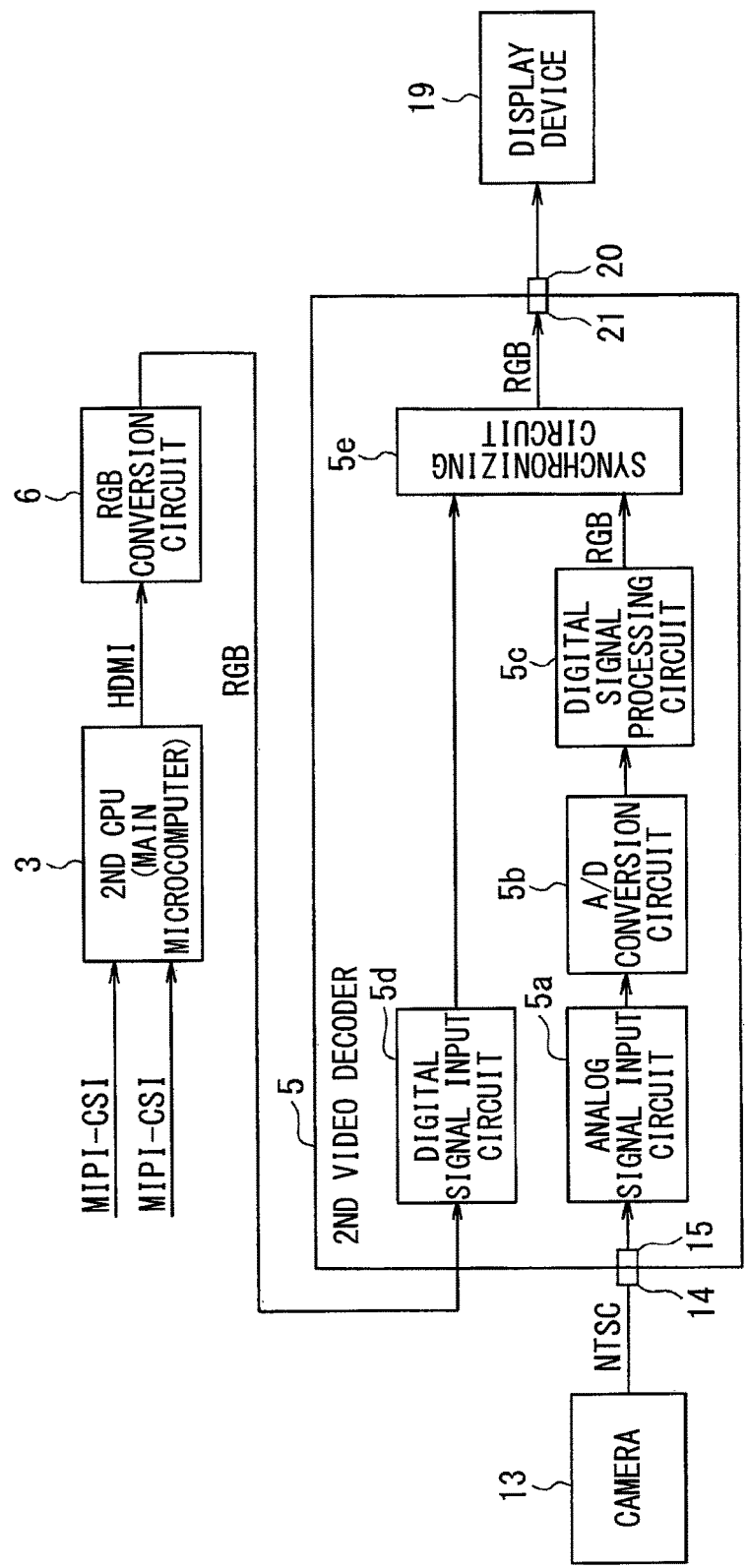
FIG. 3 is a functional block diagram illustrating a configuration of a second video decoder.

Upon receiving the operating power from the first power supply control circuit 7 through the power line 23, the second video decoder 5 shifts from the off-state to the normal operating state. As illustrated in FIG. 3, the second video decoder 5 includes an analog signal input circuit 5*a*, an analog-digital (A/D) conversion circuit 5*b*, a digital signal processing circuit 5*c*, a digital signal input circuit 5*d*, and a synchronizing circuit 5*e*. Upon receiving the NTSC signal from the camera 13, the analog signal input circuit 5*a* outputs the received NTSC signal to the A/D conversion circuit 5*b*. Upon receiving the NTSC signal from the analog signal input circuit 5*a*, the A/D conversion circuit 5*b* converts the received NTSC signal from an analog signal to a digital signal, and outputs the converted digital signal to the digital signal processing circuit 5*c*. Upon receiving the NTSC signal from the A/D conversion circuit 5*b*, the digital signal processing circuit 5*c* converts the received NTSC signal into the RGB signal, and outputs the converted data to the synchronizing circuit 5*e*. Upon receiving the RGB signal from the digital signal processing circuit 5*c*, the synchronizing circuit 5*e* outputs the received RGB signal to the display device 19. That is, when receiving the NTSC signal transmitted from the camera 13 bypassing the first video decoder 4 and the second CPU 3, the synchronizing circuit 5*e* outputs, to the display device 19, RGB signal which is converted from the NTSC signal of the camera 13.

Upon receiving the RGB signal from the RGB conversion circuit 6, the digital signal input circuit 5*d* outputs the received RGB signal to the synchronizing circuit 5*e*. Upon receiving the RGB signal from the digital signal input circuit 5*d*, that is, upon receiving, through the first image decoder 4 and the second CPU 3, the RGB signal which is converted from the NTSC signal of the camera 13 the synchronizing circuit 5*e* outputs the received RGB signal to the display device 19.

In the above configuration, the first CPU 2 starts the activation after the accessory power supply switches from OFF to ON, and the second CPU 3 starts the activation after the activation of the first CPU 2 is completed. For that reason, during a period from the accessory power supply is switched from OFF to ON until the second CPU 3 completes the activation, the second CPU 3 cannot perform the image processing. In other words, the RGB signal is not output from the RGB conversion circuit 6 to the second video decoder 5, and the image (processed image) processed by the second CPU 3 cannot be displayed on the display device 19.

Figure 4:
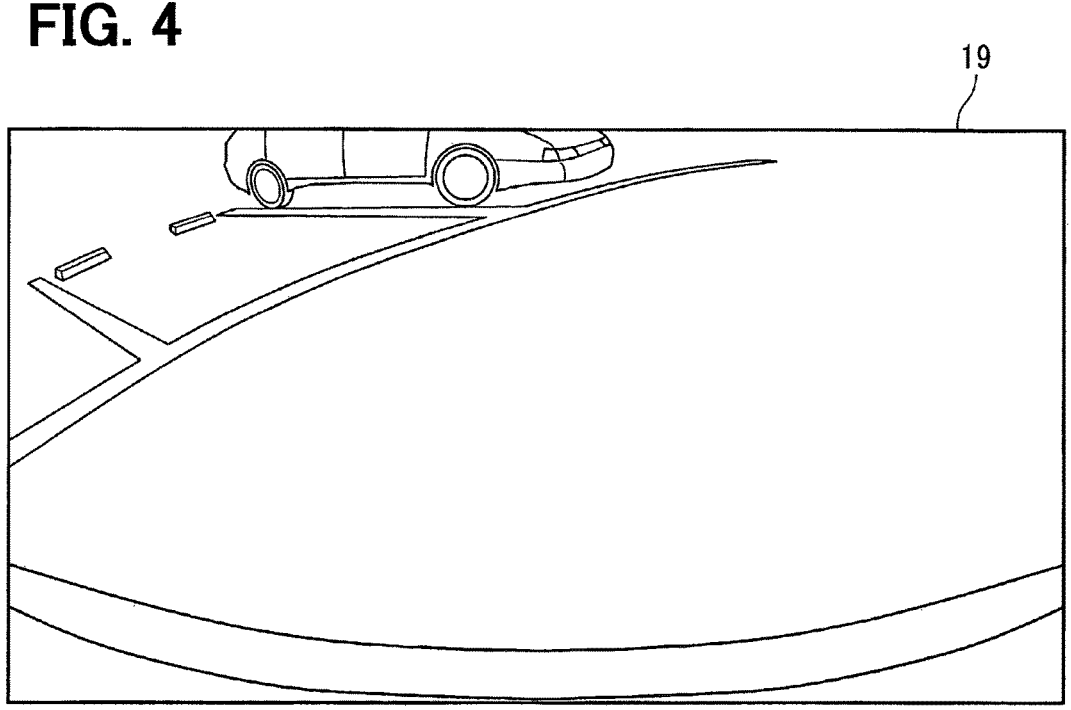
FIG. 4 is a diagram illustrating a raw image to be display on a display device.

With consideration of the above circumstance, in the above configuration, after shifting from the off-state to the normal operating state, during a period before the second video decoder 5 receives the RGB signal from the RGB conversion circuit 6, the second video decoder 5 performs data conversion to the NTSC signal transmitted from the camera 13 bypassing the first video decoder 4 and the second CPU 3, and outputs the data-converted RGB signal to the display device 19. In other words, as illustrated in FIG. 4, the second video decoder 5 displays the image (raw image) which is not processed by the second CPU 3 on the display device 19.

Figure 5:
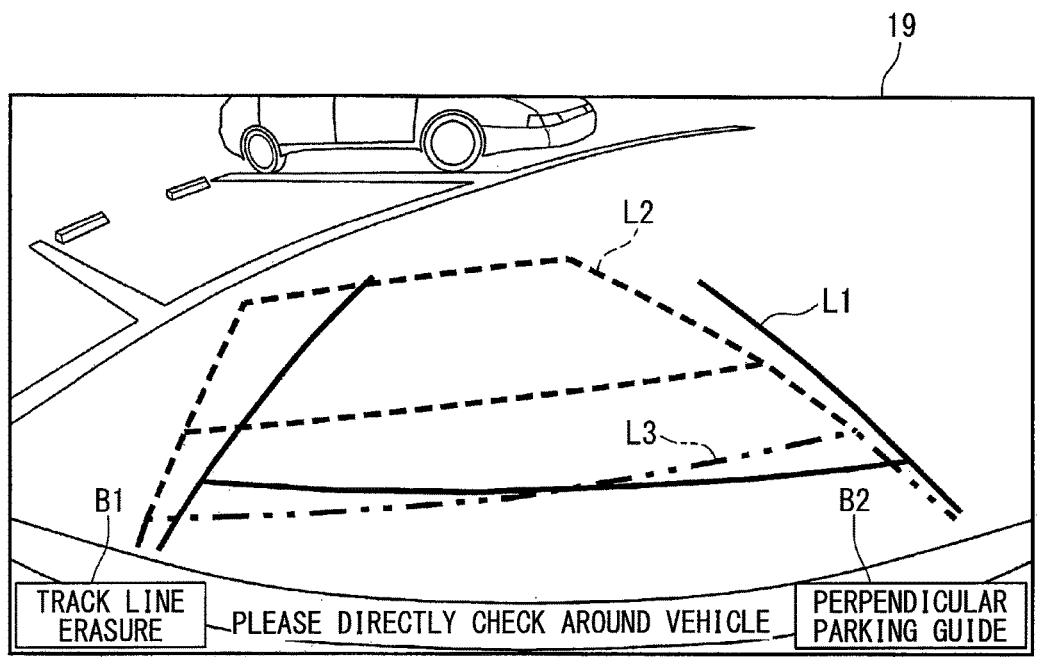
FIG. 5 is a diagram illustrating a processed image to be displayed on the display device.

After the second CPU 3 completes the activation, upon receiving the RGB signal from the RGB conversion circuit 6, the second video decoder 5 outputs the RGB signal transmitted from the camera 13 through the first video decoder 4 and the second CPU 3 to the display device 19. In other words, as illustrated in FIG. 5, the second video decoder 5 displays the image (processed image) processed by the second CPU 3 on the display device 19. FIG. 5 illustrates a configuration in which the guide lines and the button key are on-screen drawn as the image processing, and the on-screen drawn image is displayed. The guide lines include, for example, a vehicle width extension line L1 (indicated by solid lines) indicating a line obtained by extending the vehicle width, a track prediction line L2 (indicated by dashed lines) indicating a line predicting a track at the current steering angle, and a distance reference line L3 (indicated by a two-dot chain line) indicating a distance of about 0.5 m from a rear end of the vehicle. In that case, in the display device 19, the vehicle width extension line L1 is displayed, for example, with green, the track prediction line L2 is displayed, for example, with yellow, and the distance reference line L3 is displayed, for example, with red. Thus, the guide lines are displayed with colors. The button keys include a "track line erasure" button key B1 operable by the user and a "perpendicular parking guide" button key B2.

As described above, during a period after the accessory power supply is switched from OFF to ON and before the second image decoder 5 receives the RGB signal from the RGB conversion circuit 6, the second video decoder 5 displays the unprocessed image (raw image). When the second CPU 3 completes the activation and the second image decoder 5 receives the RGB signal from the RGB conversion circuit 6, the second image decoder 5 displays the image that has been processed (processed image). In other words, the second video decoder 5 switches the RGB signal to be output to the display device 19, and switches the display of the video from the unprocessed video to the processed video.

Incidentally, in the configuration in which the display of the image is switched as described above, there is a risk that the black screen is displayed when switching of the display of the image takes place. Regarding this matter, the present embodiment performs the following process.

Subsequently, the operation of the above configuration will be described with reference to FIG. 6.

Figure 6:
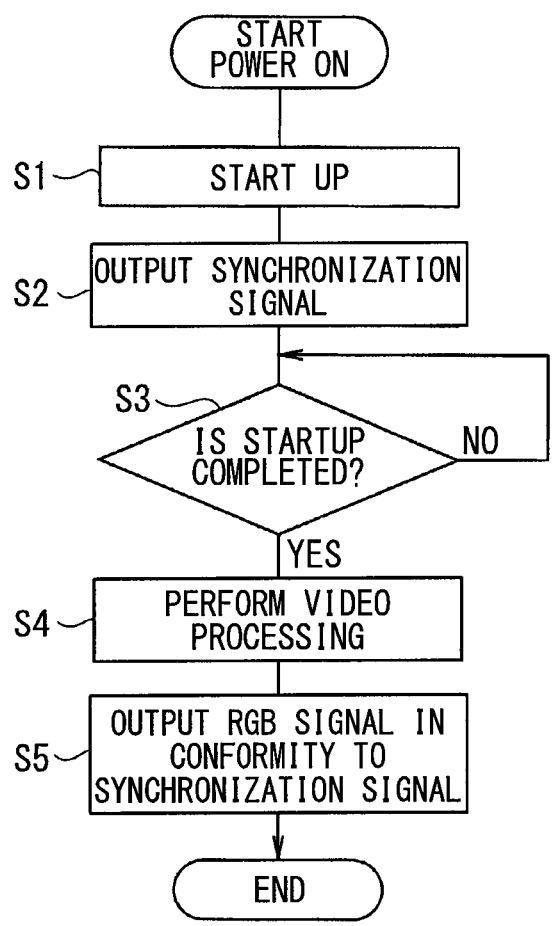
FIG. 6 is a flowchart illustrating a process to be performed by the second CPU.

According to the present disclosure, the second CPU 3 executes an image signal processing program shown in FIG. 6. Incidentally, in this example, a case in which the driver turns on the accessory power supply and immediately shifts the shift lever to the reverse position will be described. The image signal processing program may be provided as an image signal processing program product stored in a computer-readable non-transitory tangible storage medium.

Upon detecting a power-on in response to a power supply of operating power from the second power supply control circuit 8 through the power line 24, the second CPU 3 starts the activation (S1, first procedure). In this situation, upon starting the activation, the second CPU 3 generates and outputs the synchronization signal even before completing the activation (prior to the activation completion) (S2), and waits for the activation completion (S3, second procedure).

Upon starting the pre-defined activation procedure and normally completing the activation procedure, the second CPU 3 determines that the activation has been completed (S3: YES) and processes the image included in the signal of the MIPI-CSI data format received from the first video decoder 4 (S4). In other words, the second CPU 3 on-screen draws the guide lines and the button keys as the image processing. Then, the second CPU 3 outputs the RGB signal including the processed image in conformity to the synchronization signal (S5, third procedure).

The second video decoder 5 receives the synchronization signal even before the second CPU 3 completes the activation by controlling the second CPU 3 to perform the above series of processing. In this situation, the second video decoder 5 outputs the NTSC signal received from the camera 13 in conformity to the synchronization signal received from the RGB conversion circuit 6 until the second video decoder 5 receives the RGB signal conforming to the synchronization signal from the RGB conversion circuit 6. Thereafter, the second CPU 3 completes the activation, and upon receiving the RGB signal including the processed image in conformity to the synchronization signal, the second video decoder 5 outputs the RGB signal in conformity to the synchronization signal.

In other words, upon receiving the RGB signal from the RGB conversion circuit 6 after the activation of the second CPU 3 is completed, the second video decoder 5 switches the RGB signal output to the display device 19 from the RGB signal including the raw image to the RGB signal including the processed image. However, even before the second CPU 3 completes the activation (prior to the completion of activation), the second video decoder 5 receives the synchronization signal from the second CPU 3. For that reason, the second video decoder 5 does not need to switch the synchronization signal when switching the RGB signal to be output to the display device 19, and can switch the display of the image seamlessly while keeping a synchronized state (without loss of synchronization).

As described above, the present embodiment can obtain advantages described below.

In the image signal processing apparatus 1, upon starting the activation, the second CPU 3 outputs the synchronization signal to the second video decoder 5 even before completion of the activation, and upon completing the activation, the second CPU 3 outputs the RGB signal including the processed image to the second video decoder 5 in conformity with the synchronization signal. During a period before the second video decoder 5 receives the RGB signal including the processed image from the second CPU 3, the second video decoder 5 outputs the RGB signal, which is converted from the NTSC signal transmitted from the camera 13 bypassing the second CPU 3, in conformity to the synchronization signal input from the second CPU 3. With the above configuration, the second video decoder 5 has no need to switch the synchronization signal when switching the image signal to be output to the display device 19, and can switch the display of the image seamlessly while keeping a synchronized state (without loss of synchronization). Hence, the display of the black screen can be avoided when switching the display of the image.

In that case, since the guide lines and the button keys are on-screen drawn as the image processing with the use of the camera 13 that captures images of the vehicle rear side which is a blind spot of the driver, the display of the black screen can be avoided when switching the display of the image indicating rear side of the vehicle from the raw image to the image in which the guide lines and the button keys are on-screen drawn.

The present disclosure is not limited to the above embodiments, and can be modified or expanded as follows.

The image capturing unit is not limited to the rear camera that captures images of the rear side of the vehicle, but may be provided by a side camera that captures images of a lateral side of the vehicle.

The second control unit is not limited to the process in which the guide lines and the button keys are on-screen drawn as the image processing. Alternatively, only the guide lines may be on-screen drawn, or only the button keys may be on-screen drawn. When the guide lines are on-screen drawn, only one of the vehicle width extension line, the track prediction, or the distance reference line may be on-screen drawn.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. An image signal processing apparatus comprising:
    a first control unit starting an activation in response to an activation request;
    a second control unit starting an activation when the first control unit completes the activation and shifting from an off-state to a normal operating state after the activation is completed, wherein the second control unit processes, in the normal operating state, an image included in an image signal in response to a reception of the image signal from an image capturing unit, and outputs an image signal including a processed image; and
    a decoding unit starting an activation when the first control unit completes the activation and shifting from an off-state to a normal operating state after the activation is completed, wherein
    the decoding unit:
        receives, in the normal operating state, the image signal including an unprocessed image and transmitted from the image capturing unit bypassing the second control unit, and the image signal including the processed image and transmitted from the image capturing unit through the second control unit;

outputs, to a display unit, one of the image signals that are received; and controls the display unit to display one of the unprocessed image or the processed image, when the second control unit starts the activation, the second control unit outputs a synchronization signal to the decoding unit even before completing of the activation, when the second control unit completes the activation, the second control unit outputs the image signal including the processed image in conformity to the synchronization signal, and during a period before the decoding unit receives the image signal including the processed image from the second control unit, the decoding unit outputs, to the display unit, the image signal transmitted from the image capturing unit bypassing the second control unit in conformity to the synchronization signal outputted from the second control unit.

2. The image signal processing apparatus according to claim 1, wherein the second control unit receives, from the image capturing unit, the image signal including an image acquired by the image capturing unit and indicating a rear side of a vehicle.

3. The image signal processing apparatus according to claim 2, wherein the second control unit on-screen draws guide lines and a button key to generate the processed image.

4. An image signal processing program product stored in a computer-readable non-transitory tangible storage medium, comprising instructions to be executed by a computer included in an image signal processing apparatus, wherein the image signal processing apparatus includes:

a first control unit starting an activation in response to an activation request;

a second control unit starting an activation when the first control unit completes the activation and shifting from an off-state to a normal operating state after the activation is completed, wherein the second control unit processes, in the normal operating state, an image included in an image signal in response to a reception of the image signal from an image capturing unit, and outputs an image signal including a processed image; and a decoding unit starting an activation when the first control unit completes the activation and shifting from an off-state to a normal operating state after the activation is completed, wherein the decoding unit receives, in the normal operating state, the image signal including an unprocessed image and transmitted from the image capturing unit bypassing the second control unit, and the image signal including the processed image and transmitted from the image capturing unit through the second control unit, outputs one of the image signals that are received to a display unit, and controls the display unit to display one of the unprocessed image or the processed image, the instructions comprising:

after starting the activation, controlling the second control unit to output a synchronization signal to the decoding unit even before the second control unit completes the activation;

controlling the second control unit to determine whether the second control unit has completed the activation; and controlling the second control unit to output the image signal including the processed image in conformity to the synchronization signal when determining that the second control unit has completed the activation.

5. The image signal processing apparatus according to claim 1, wherein the decoding unit includes a synchronizing circuit in which the synchronization signal output from the second control unit is input, during a period from the second control unit starts the activation until the second control unit completes the activation, the decoding unit outputs, to the display unit, the image signal transmitted from the image capturing unit bypassing the second control unit and including an unprocessed image from the synchronizing circuit in conformity to the synchronization signal, and after the second control unit completes the activation and outputs the image signal including the processed image in conformity to the synchronization unit, the decoding unit switch the image signal output from the synchronizing circuit to the display unit from the image signal including the unprocessed image and being in conformity to the synchronization signal to the image signal including the processed image and being in conformity to the synchronization signal.

6. The image signal processing program product according to claim 4, wherein the decoding unit includes a synchronizing circuit in which the synchronization signal output from the second control unit is input, the instructions further comprising:

during a period from the second control unit starts the activation until the second control unit completes the activation, controlling the decoding unit to output, to the display unit, the image signal including the unprocessed image from the synchronizing circuit in conformity to the synchronization signal; and after the second control unit completes the activation and outputs the image signal including the processed image in conformity to the synchronization unit, controlling the decoding unit to switch the image signal output from the synchronizing circuit to the display unit from the image signal including the unprocessed image and being in conformity to the synchronization signal to the image signal including the processed image and being in conformity to the synchronization signal.

* * * * *